United States Patent
Loos et al.

(10) Patent No.: US 8,670,598 B2
(45) Date of Patent: Mar. 11, 2014

(54) DEVICE FOR CREATING AND/OR PROCESSING AN OBJECT SIGNATURE, MONITORING DEVICE, METHOD AND COMPUTER PROGRAM

(75) Inventors: Hartmut Loos, Hildesheim (DE); Jan Karl Warzelhan, Bad Salzdefurth ot Heinde (DE)

(73) Assignee: Robert Bosch GmbH, Stuttgart (DE)

( * ) Notice: Subject to any disclaimer, the term of this patent is extended or adjusted under 35 U.S.C. 154(b) by 729 days.

(21) Appl. No.: 12/922,225

(22) PCT Filed: Oct. 19, 2009

(86) PCT No.: PCT/EP2009/063666
§ 371 (c)(1),
(2), (4) Date: Sep. 13, 2010

(87) PCT Pub. No.: WO2010/057732
PCT Pub. Date: May 27, 2010

(65) Prior Publication Data
US 2011/0019871 A1  Jan. 27, 2011

(30) Foreign Application Priority Data
Nov. 21, 2008 (DE) .......................... 10 2008 043 953

(51) Int. Cl.
*G06K 9/00* (2006.01)

(52) U.S. Cl.
USPC .......................................... 382/119; 382/232

(58) Field of Classification Search
None
See application file for complete search history.

(56) References Cited

U.S. PATENT DOCUMENTS

| | | | | |
|---|---|---|---|---|
| 6,141,438 A * | 10/2000 | Blanchester | ................... | 382/140 |
| 6,298,153 B1 * | 10/2001 | Oishi | ............................. | 382/186 |
| 6,507,912 B1 * | 1/2003 | Matyas et al. | ................. | 713/186 |
| 6,580,809 B2 * | 6/2003 | Stach et al. | ..................... | 382/100 |
| 6,583,813 B1 * | 6/2003 | Enright et al. | ................. | 348/150 |
| 7,020,308 B1 * | 3/2006 | Shinzaki et al. | .............. | 382/124 |
| 7,113,633 B2 * | 9/2006 | Petrich | ........................... | 382/154 |
| 7,149,325 B2 * | 12/2006 | Pavlidis et al. | ............... | 382/103 |
| 7,158,657 B2 * | 1/2007 | Okazaki et al. | ............... | 382/118 |
| 7,454,033 B2 * | 11/2008 | Stach et al. | .................... | 382/100 |
| 7,519,200 B2 * | 4/2009 | Gokturk et al. | ............... | 382/118 |

(Continued)

FOREIGN PATENT DOCUMENTS

DE  10 2005 053 148  5/2007

OTHER PUBLICATIONS

Sergio Velastin & Paolo Remagnino:"Intelligent Distributed Video . . ." Intelligent Distributed Surveillance Systems, IEE London, GB, Jan. 1, 2006, pp. 1-30 (in English).

(Continued)

*Primary Examiner* — Manav Seth
(74) *Attorney, Agent, or Firm* — Michael J. Striker

(57) ABSTRACT

The invention relates to a device (2) for creating and/or processing an object signature of an object from a scene, wherein the object signature is designed to describe and/or identify the object, comprising a characteristic extraction unit (5) designed to extract at least one characteristic value of the object from the scene, and wherein the characteristic value can be displayed in a characteristics space of the characteristic. The device further comprises a coding unit (8) designed to code the characteristic value into an identification data unit, wherein the identification data unit forms part of the object signature, and wherein the identification data unit refers to a partial region of the characteristic space of the characteristic.

11 Claims, 2 Drawing Sheets

(56) References Cited

U.S. PATENT DOCUMENTS

| | | | |
|---|---|---|---|
| 7,542,610 B2 * | 6/2009 | Gokturk et al. | 382/209 |
| 7,595,816 B1 * | 9/2009 | Enright et al. | 348/150 |
| 7,657,090 B2 * | 2/2010 | Omatsu et al. | 382/173 |
| 7,769,197 B2 * | 8/2010 | Fujii et al. | 382/100 |
| 7,945,099 B2 * | 5/2011 | Gokturk et al. | 382/209 |
| 7,970,164 B2 * | 6/2011 | Nakamura et al. | 382/100 |
| 8,111,304 B2 * | 2/2012 | Ohtsuka et al. | 348/231.6 |
| 2004/0125983 A1 * | 7/2004 | Reed et al. | 382/100 |
| 2005/0063596 A1 * | 3/2005 | Yomdin et al. | 382/232 |
| 2005/0273611 A1 * | 12/2005 | Yoshimura | 713/176 |
| 2007/0104267 A1 | 5/2007 | Meyer et al. | |

OTHER PUBLICATIONS

Theodoridis, S., et al: "Pattern Recognition, Passage" Pattern Recognition, San Diego, CA: Academic Press, US, Jan. 1, 1999, pp. 403-441, 484-486 (in English).

Antani, S., et al: "A Survey on the Use of Pattern . . ." Pattern Recognition, Elsevier, GB, vol. 35, No. 4, Apr. 1, 2002, pp. 945-965 (in English).

* cited by examiner

DEVICE FOR CREATING AND/OR PROCESSING AN OBJECT SIGNATURE, MONITORING DEVICE, METHOD AND COMPUTER PROGRAM

CROSS-REFERENCE

The invention described and claimed hereinbelow is also described in PCT/EP2009/063666, filed on Oct. 19, 2009 and DE 10 2008 043 953.3, filed Nov. 21, 2008. This German Patent Application, whose subject matter is incorporated here by reference, provides the basis for a claim of priority of invention under 35 U.S.C. 119(a)-(d).

BACKGROUND INFORMATION

The invention relates to a device for creating and/or processing an object signature of an object in a scene, wherein the object signature is designed to describe and/or identify the object, comprising a characteristic extraction unit designed to extract at least one characteristic value of the object from the scene, wherein the characteristic value can be displayed in a characteristic space of the characteristic, and comprising a coding unit designed to code the characteristic value into an identification data unit, wherein the identification data unit forms a part of the object signature. The invention furthermore relates to a surveillance device, a method, and a related computer program.

Known embodiments of video surveillance systems include a plurality of surveillance cameras which also observe complex surveillance scenes. In many embodiments, the image data streams from the surveillance regions are combined and evaluated in a central location. In addition to an evaluation being performed by surveillance personnel, automated surveillance using image-processing algorithms has since become established. A typical procedure is to separate moving objects from the (substantially stationary) scene background, track them over time, and, if relevant movements are identified, trigger an alarm or continue tracking the objects.

If the surveillance region covers a wide area, it is also common to track the moving objects not only within the viewing field of a single camera, but also across the entire camera network within the surveillance region and for an extended period of time. The problem associated therewith is that of recognizing the moving objects in different locations and at different points in time. The reason for this is that the viewing fields of the cameras often do not overlap, and therefore a moving object leaves the viewing field of one camera and enters the viewing field of another camera at an undetermined, later point in time. To enable recognition to be performed, as much information as possible is collected about the moving objects when they appear. This collection of information is called the object signature. Using the object signature, it is now possible to recognize the objects in the camera network.

Publication DE 10 2005 053 148 A1, for example, which is the closest prior art, discloses a method for handling content information in a video surveillance system. Accordingly, content information on individual objects is made available in a network, and is distributed via the network. The content information is collected at various hierarchy levels, wherein the various hierarchy levels can be read independently of each other. It is also provided that the content information is coded in order to compress content information from lower hierarchy levels into higher hierarchy levels to create overview information, thereby advantageously enabling this overview information in the higher hierarchy levels to be used in a search for relevant events, in order to limit a review of image archives of video data to short, relevant time periods.

DISCLOSURE SUMMARY OF THE INVENTION

A device for creating and/or processing an object signature and a surveillance device.

The invention relates to a device that is suitable and/or designed for creating and/or processing—in particular for the purposes of making a comparison—an object signature of an object in a scene. The object is preferably embodied as a moving object, such as a person, an automobile, or the like. The scene is understood to be a section of a surveillance region that is observed or can be observed using sensors. The sensors are preferably designed as cameras; as an alternative or in addition thereto, other sensors such as temperature sensors, odor sensors, microphones, etc. can be used. The object signature is a data collection designed to describe and/or identify the object, in particular within the scope of recognizing it or performing a comparison.

The device includes a characteristic extraction unit that can extract at least one characteristic value of the object from the scene, and preferably a plurality of characteristic values is extracted. The characteristic value can be displayed in a characteristic space of the characteristic, the characteristic space being formed by a large number of possible characteristic values for the characteristic. Every characteristic can therefore take on a plurality of characteristic values of this type in the characteristic space. For example, the characteristic space is designed as a color histogram occupied by structure characteristics, SIFT characteristics, noises, odors, etc.

Furthermore, a coding device is provided that is designed to code the characteristic value into an identification data unit, in particular into a dimensionless identification data unit, wherein the identification data unit forms a portion of the object signature.

Within the scope of the invention it is provided that the identification data unit refers to a subregion of the characteristic space of the characteristic. In particular, the identification data unit for the characteristic is not descriptive in and of itself, but rather represents a transformed or mapped value.

In contrast to the known prior art, the characteristic value itself is not integrated into the object signature. Instead, only a reference to the subregion that contains the characteristic value is contained in the object signature. This embodiment has the advantage of ensuring that objects are described in a very efficient and compact manner. Instead of forwarding the often highly complex characteristic values, only the references—which are comparable to pointers in C syntax—to the subregions are forwarded with the characteristic values.

According to a preferred embodiment of the invention, the identification data units are each designed as a multibit word. Depending on the complexity of the characteristic space and the number of subregions thereof to be taken into account, an 8-bit, 16-bit, or 32-bit word is used as the object data unit, and therefore the storage or transfer requirement for the associated characteristic in the object signature is limited to this word length. The subregion is preferably selected such that it combines a plurality of characteristic values. In particular it can be provided that subregions of a characteristic space comprise different quantities of characteristic values.

Preferably the object signature includes not just one identification data unit of a single characteristic, but rather a plurality of identification data units that are assigned to various characteristics. The type of characteristics is not limited; for instance, the characteristics can describe optical properties such as color, brightness, texture, etc., motion e.g. speed or acceleration, and/or acoustic features e.g. the sound of footsteps, or odors, etc. of the object. It is basically also possible to use electromagnetic radiation such as emission radiation from cellular phones and the like as characteristics in the object signature, and to reference them using the identification data units.

According to a preferred embodiment of the invention, the device includes a subspace generator designed to create the characteristic space and/or the subregions in the characteristic space. The subregions can cover the characteristic space entirely, but it is preferable for the subregions to be separate from each other or to be disposed in the characteristic space in a disjoint manner. The characteristic space and/or the subregions can be created in a training phase e.g. off-line in advance or on-line during the running time of the device. Preferably care is taken to ensure that the characteristic space associated with each characteristic is subdivided into subregions or clusters in a meaningful manner. A meaningful clustering can be attained e.g. by recording a large quantity of test data (objects that appear in a surveillance network), and to use these test data to occupy the characteristic space and subsequently cluster it. The more clusters that are created in the characteristic space, the finer the differences are that can be extracted from the objects, but also the more expensive and extensive is the transmission and/or processing of object signatures since the word length of the identification data unit for the characteristic space required for transmission increases as complexity increases.

Preferably the coding unit is designed such that an object receives the identification data unit from the subregion that is closest to the characteristic value in the characteristic space. The characteristic space can also be expanded during the running time of the device by defining new subregions if the characteristic values are too far removed from the previous subregions.

In the ideal case it would be sufficient to compare only the identification data units of the object signatures with each other in order to detect and identify identical objects. This does function, although typically not in an optimal manner since the characteristic values for identical objects vary greatly due to affine distortions, scale changes, lighting changes, localization errors, or in general due to noise in the characteristic values. For this reason, allegedly identical characteristic values (the same characteristic is calculated for the same object at another point in time) are not assigned to the same subregion, and therefore the identification data units for this characteristic differ.

Due to this difficulty, it is preferable for the subspace generator to be designed to create a similarity measure between the subregions of a single characteristic space. The similarity measure is an assessment of the similarity between two subregions. The advantage of introducing the similarity measure is that the result of a comparison between an actual object and a reference object is not dependent exclusively on the identity of object signatures, but rather on the similarity of object signatures.

In one possible embodiment of the invention, the similarity measure is designed as a similarity graph, and the subregions are connected as nodes or clusters across paths. The similarity of two subregions is determined e.g. by the number of intermediate nodes between two subregions and/or the length of the paths extending between them, preferably along the shortest path in every case.

According to a development of the invention, the device includes a comparator unit designed to perform a comparison between a first object signature having first identification data units and a second object signature having second identification data units on the basis of the similarity measure. When the comparison is carried out, the similarity functions of each characteristic are fused in particular, thereby resulting in a more robust recognition of objects. It lies within the scope of the invention for each of the characteristics to be handled equally; in modified embodiments, the characteristics can also be handled in a weighted manner, and so more significant characteristics are weighted more heavily in the comparison than are less significant characteristics.

A further subject of the invention relates to a surveillance device, in particular a video surveillance system comprising a plurality of surveillance cameras which are and/or may be disposed in a network to monitor a surveillance region, and comprising at least one device according to one of the preceding claims, wherein the object signatures are transferred via the network. In this embodiment of the invention, the advantage of minimizing the data to be transmitted in the case of the object signature according to the invention is realized particularly effectively.

To enable two object signatures to be compared at any point in the network when one or more data memories are provided in the network, it is preferable to provide one or more data memories in the network, in which the characteristic spaces or the subregions and their mapping onto the identification data, and/or the similarity measure are stored. When a comparison is performed, after the object signature has been transferred or generated, the data memory can be accessed from any point in the network, thereby making it possible to determine the similarity between two object signatures.

A further subject of the invention relates to a method for creating and/or processing and/or searching for or retrieving an object signature. The method that has been presented makes it possible to efficiently store, search for, and/or compare object signatures. A final subject matter of the present invention relates to a computer program.

BRIEF DESCRIPTION OF THE DRAWINGS

Further features, advantages, and effects of the invention result from the following description of a preferred embodiment of the invention. In the figures.

DETAILED DESCRIPTION OF THE PREFERRED EMBODIMENTS

Figure 1:
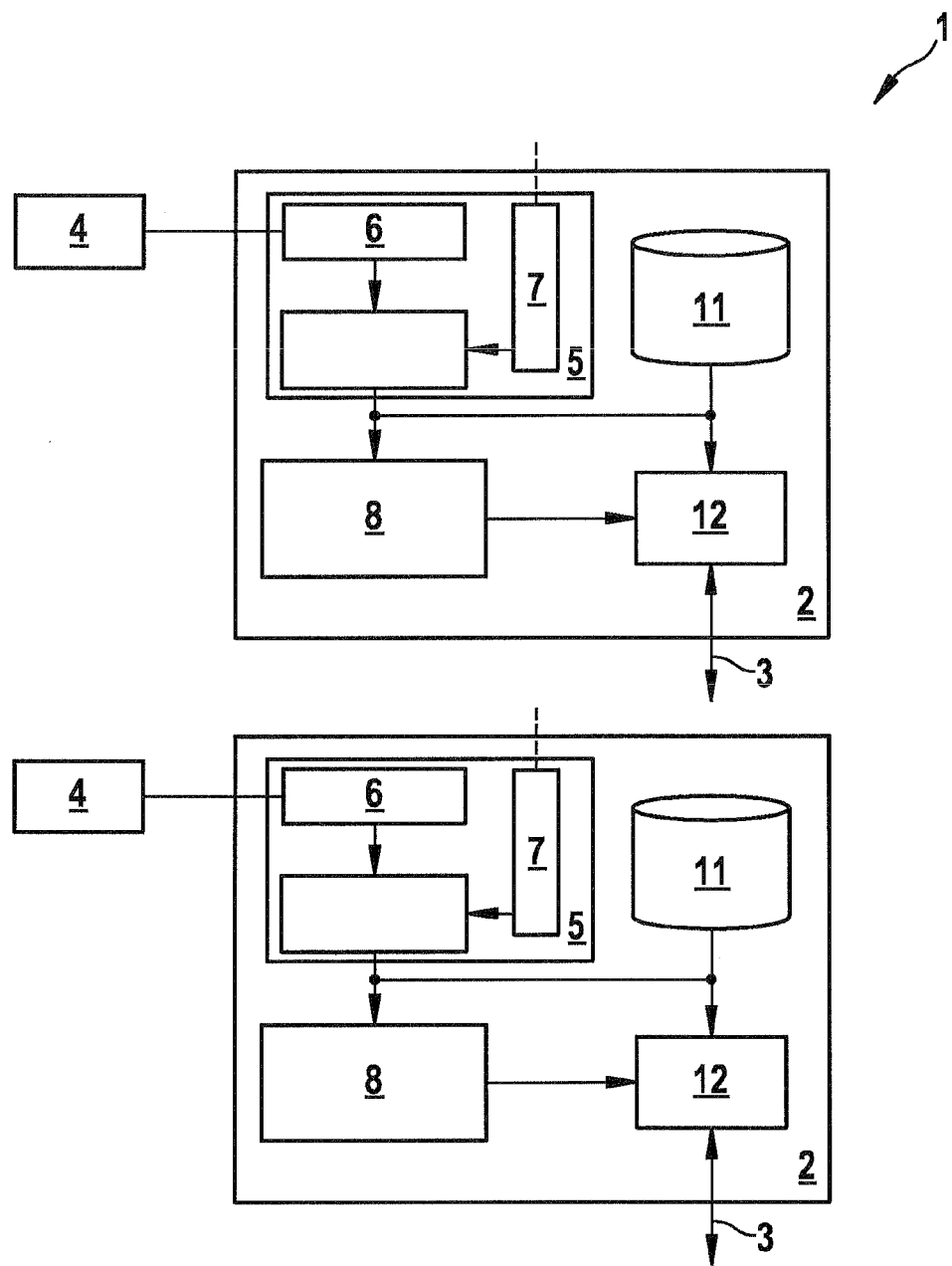
FIG. 1 shows a schematic block diagram of a surveillance device, as an embodiment of the invention.

FIG. 1 shows a schematic block diagram of a surveillance system 1 which is suited and/or designed to monitor a complex surveillance region e.g. streets, buildings, factory halls, libraries, etc. Surveillance system 1 comprises a plurality of surveillance devices 2 which are connected to each other via a network 3. Network 3 can have any design e.g. it can be wireless or wired, it can be a LAN, WLAN, the Internet, etc. Surveillance devices 2 each include sensors 4 which detect a portion of the surveillance region as a scene. For example, sensors 4 are designed as surveillance cameras. Particularly preferably, surveillance devices 2 including sensor 4 are designed as "smart" cameras since the invention supports the use of devices that do not have much computing power.

One function of surveillance system 1 is to track moving objects, such as persons, in the surveillance region. To this end, the moving objects that were detected by a first surveillance device 2 must be recognized in a detection performed by another surveillance device 2. For purposes of recognition, an object signature is created for every detected object in every surveillance device 2, and is compared with object signatures from other surveillance devices 2 that are distributed throughout network 3. If the current object signature matches an object signature from another surveillance device 2, then an object is considered to have been recognized. If no matching or corresponding object signatures can be found, then the object is considered to be a newcomer in the surveillance region. This situation can occur e.g. in entry regions of the surveillance region.

To create the object signature, the sensor data from sensors 4, in particular the images or image sequences from the surveillance cameras, are transmitted to a characteristic extraction unit 5 which detects characteristics of a current moving object. For example, it is possible for characteristic extraction unit 5 to include a device for object detection and tracking 6 which, as mentioned initially, first separates moving objects from the substantially static scene background and then tracks them over time. Starting with these detected objects, optical or kinetic characteristics, such as color, brightness, texture, or speed or acceleration, are extracted and a characteristic value is assigned to each of these characteristics for the current object. Characteristic extraction unit 5 can also contain further modules 7 for extracting other characteristics such as acoustic characteristics, etc.

Figure 2:
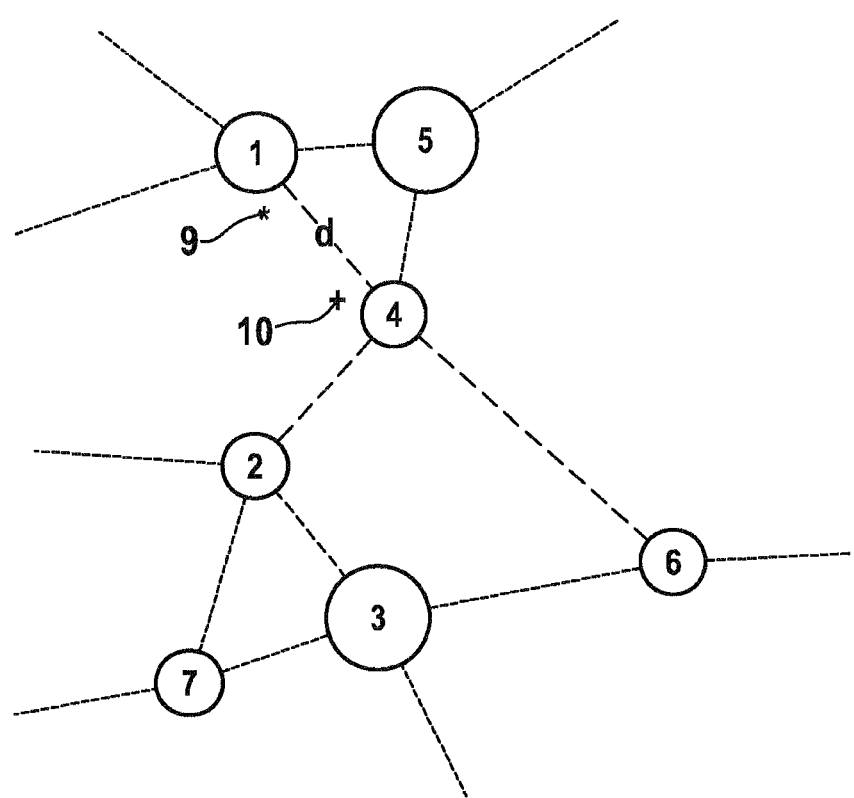
FIG. 2 shows an illustration of a characteristic space.

The characteristic values of the characteristics are transferred to a coding unit 8 which assigns an identification data unit in the form of a cluster ID to each characteristic value of a characteristic. Reference is made to FIG. 2 for an explanation of the cluster ID.

FIG. 2 is a schematicized depiction of a cluster diagram that is intended to define a characteristic space. The characteristic space can be two-dimensional, as drawn, but can also be three-dimensional or multi-dimensional. In the characteristic space, potential or detected characteristic values are entered and then combined into clusters 1, 2, . . . 7 e.g. during a learning phase or even during operation of surveillance system 1. A meaningful clustering can be attained e.g. by recording a large quantity of test data and then using these test data to occupy and cluster the characteristic space. The more clusters that are created in the characteristic space, the finer the differences are that can be extracted from objects, but likewise the larger the cluster IDs become. The characteristic space can also be expanded during the running time by forming new clusters. Depending on how many clusters are calculated in a characteristic space, the size of the cluster ID (8-bit, 16-bit, or 32-bit) of a cluster and therefore the memory or transfer requirement for this characteristic type is specified in the object signature.

A current characteristic value of a current object 9 is assigned to the cluster that is closest in the characteristic space. For example, characteristic value 9, which is marked with an asterisk, is assigned to cluster ID 1, and characteristic value 10, which is marked with a cross, is assigned to cluster ID 4.

To assign the current characteristic values to the cluster IDs, surveillance device 2 includes a data memory 11 for storing the characteristic space and the clusters.

As soon as all characteristic values have been mapped to cluster IDs, the object-signature generation is halted. The object signature is now composed largely or exclusively of the cluster IDs, each of which is designed as a multibit word. The majority of information therefore remains in data memory 11, and only the references to the information are stored in the object signature. Objects are therefore described in a very efficient and compact manner.

To recognize an object, surveillance device 2 includes a comparator unit 12 which compares an object signature, which is transmitted via network 3, with the current object signature. Ideally, it would be sufficient to compare only the cluster IDs of the object signatures with each other in order to identify objects that are identical or the same. This procedure is typically susceptible to error, however, since the characteristic values vary or contain noise. These variations can be created e.g. due to the object changing its pose and/or to lighting of the object changing. As a result of these situation-dependent, static or systematic errors, the characteristic values of identical objects will be different, and are also likely to be assigned to different cluster IDs.

For this reason, a similarity graph is added to the characteristic space in FIG. 2, whereby the distance between different cluster IDs is indicated in the form of a path length d or the number of nodes that must be passed in the similarity graph, and a measure of the similarity of two clusters is represented. The similarity graph is stored in data memory 12 or in a central memory in network 3. For the case in which the characteristic space and/or the similarity graph changes during the running time, the changes are forwarded to the other data memory 12 of the other surveillance devices 2 or to the central memory or memories.

A similarity comparison between two object signatures is carried out in comparator unit 12 in addition to or instead of an identity comparison. To this end, the similarity of the cluster IDs of two object signatures is calculated for each characteristic. All similarities of all characteristics of the object signatures are then accumulated to obtain a global statement about the similarity of the objects. The accumulation is carried out e.g. by summing, with the characteristics being weighted differently. Objects can be recognized in a very robust manner using this procedure. The method can be applied to any characteristic, wherein the subsequent fusion of the similarity claim for each characteristic makes it possible to detect objects in a robust manner.

When video surveillance is performed using surveillance system 1, it is possible e.g. to calculate the characteristic values per frame of a camera and assign them to the particular subregion or cluster to determine the cluster ID. In order to stabilize the object signature, only those cluster IDs are used that are determined often i.e. in a plurality of frames.

What is claimed is:

1. A device (2) for creating and/or processing an object signature of an object in a scene, wherein the object signature is designed to describe and/or identify the object, comprising a characteristic extraction unit (5) designed to extract at least one characteristic value of the object from the scene, and wherein the characteristic value can be displayed in a characteristic space of the characteristic, and comprising a coding unit (8) designed to code the characteristic value into an identification data unit, wherein the identification data unit forms part of the object signature, wherein the identification data unit refers to a subregion of the characteristic space of the characteristic.

2. The device (2) according to claim 1, wherein each identification data unit is designed as a multibit word and/or at least one subregion comprises a plurality of characteristic values and/or a plurality of subregions of a characteristic space comprises a different number of characteristic values.

3. The device (2) according to claim 1, wherein the object signature comprises a plurality of identification data units which are assigned to various characteristics.

4. The device (2) according to claim 1, further comprising a subspace generator designed to create the characteristic space and/or the subregions in the characteristic space.

5. The device (2) according to claim 4, wherein the subspace generator is designed to occupy and/or update the characteristic space and/or the subregions of the characteristic space on the basis of test data and/or real-time data.

6. The device (2) according to claim 4, wherein the subspace generator is designed to create a similarity measure between the subregions of a single characteristic space.

7. The device (2) according to claim 6, wherein the similarity measure is designed as a similarity graph, and the subregions are connected as nodes across paths.

8. The device (2) according to claim 7, wherein the similarity between two subregions is determined by the number of intermediate nodes and/or the length of the intermediate paths.

9. The device (2) according to claim 1, further comprising a comparator unit (12) designed to perform a comparison between a first object signature having first identification data units and a second object signature having second identification data units on the basis of the similarity measure.

10. A method for creating and/or processing and/or searching for an object signature of an object in a scene, wherein the object signature is designed to describe and/or identify the object, preferably using the device (2) according to claim 1, at least one characteristic value of the object is extracted from the scene, the characteristic value being taken from a characteristic space of the characteristic, and wherein the characteristic is coded into an identification data unit, the identification data unit forming part of the object signature, wherein the identification data unit refers to a subregion of the characteristic space of the characteristic.

11. A non-transitory computer readable medium containing a computer program comprising program code means for carrying out all steps of the method according to claim 10 when the program is run on a computer and/or a device (2) according to claim 1.

* * * * *